US012757241B2

(12) United States Patent
Guo

(10) Patent No.: US 12,757,241 B2
(45) Date of Patent: Oct. 6, 2026

(54) METHODS FOR CONTROLLING QUALITY OF SERVICE, TERMINAL DEVICES AND NETWORK DEVICES

(71) Applicant: GUANGDONG OPPO MOBILE TELECOMMUNICATIONS CORP., LTD., Dongguan (CN)

(72) Inventor: Yali Guo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 361 days.

(21) Appl. No.: 18/681,182

(22) PCT Filed: Jun. 7, 2021

(86) PCT No.: PCT/CN2021/098620
§ 371 (c)(1),
(2) Date: Feb. 5, 2024

(87) PCT Pub. No.: WO2022/256966
PCT Pub. Date: Dec. 15, 2022

(65) Prior Publication Data
US 2024/0224318 A1 Jul. 4, 2024

(51) Int. Cl.
*H04W 72/543* (2023.01)
*H04W 28/02* (2009.01)

(52) U.S. Cl.
CPC ..... *H04W 72/543* (2023.01); *H04W 28/0263* (2013.01)

(58) Field of Classification Search
CPC ........................ H04W 72/543; H04W 28/0263
USPC ........................................................ 370/230
See application file for complete search history.

(56) References Cited

U.S. PATENT DOCUMENTS 11,792,838 B2 * 10/2023 Stojanovski .......... H04W 76/10 370/329
2020/0396636 A1 12/2020 Cheng et al.

FOREIGN PATENT DOCUMENTS

| | | | | | |
|---|---|---|---|---|---|
| CN | 101009631 | A | | 8/2007 | |
| CN | 101964996 | A | | 2/2011 | |
| CN | 106063354 | A | | 10/2016 | |
| CN | 107295576 | A | * | 10/2017 | ......... H04L 41/5003 |
| CN | 108738071 | A | | 11/2018 | |
| CN | 110754116 | A | | 2/2020 | |
| EP | 3755117 | A1 | | 12/2020 | |
| WO | 2017222344 | A1 | | 12/2017 | |
| WO | WO-2019085853 | A1 | * | 5/2019 | ............. H04L 47/31 |
| WO | WO-2020036928 | A1 | * | 2/2020 | ........ H04W 28/0268 |

OTHER PUBLICATIONS

International search report of PCT application No. PCT/CN2021/098620 issued on Feb. 23, 2022.
Ericsson, "QoS Flow Binding", SA WG2 Meeting #122bis S2-175397, Aug. 15, 2017, entire document.

* cited by examiner

*Primary Examiner* — Intekhaab A Siddiquee
(74) *Attorney, Agent, or Firm* — BAYES PLLC

(57) ABSTRACT

Provided is a method for controlling quality of service (QOS). The method is applicable to a terminal device. The method includes: determining a service data flow to which data belongs; determining a radio resource corresponding to the service data flow according to service data flow information and corresponding radio resource information; and sending the data over the radio resource.

16 Claims, 10 Drawing Sheets

METHODS FOR CONTROLLING QUALITY OF SERVICE, TERMINAL DEVICES AND NETWORK DEVICES

CROSS-REFERENCE TO RELATED APPLICATION

This application is a US national stage of international application No. PCT/CN2021/098620, filed on Jun. 7, 2021, the entire contents of which are incorporated herein by reference.

TECHNICAL FIELD

The present disclosure relates to the field of communications, and in particular, relates to methods for controlling quality of service (QOS), terminal devices, and network devices.

BACKGROUND

In a 5G network, the QoS is controlled based on a granularity of a QoS flow, and a session management function (SMF) binds a service data flow to the QoS flow according to a policy and charging control (PCC) rule received from a policy control function (PCF). One QoS flow may include multiple service data flows, and the same requirements such as the same transmission delay, transmission bit error rate and the like may be imposed for these service data flows (represented by the same 5G QoS identifier (5QI)), but different bit rate requirements are imposed for the service data flows. When the SMF binds these service data flows to the QoS flow, the sum of bit rates of the service data flows is taken as a bit rate of the QoS flow. The SMF sends a QoS requirement (including 5QI, bit rate information or the like) of the QoS flow to a base station, and the base station ensures the QoS requirement of the QoS flow by scheduling radio resources. Since it is a finest granularity that the base station identifies the QoS flow, the QoS is assured only at a QoS flow level.

SUMMARY

Embodiments of the present disclosure provide methods for controlling QoS, terminal devices and network devices.

The embodiments of the present disclosure provide a method for controlling QoS. The method is applicable to a terminal device, and includes:

determining, by the terminal device, a service data flow to which data belongs;

determining a radio resource corresponding to the service data flow according to service data flow information and corresponding radio resource information; and sending the data over the radio resource.

The embodiments of the present disclosure provide a method for controlling QoS. The method is applicable to a first network device, and includes:

receiving, by the first network device, service data flow information and a corresponding QoS parameter; and allocating, according to the QoS parameter, a radio resource to a service data flow corresponding to the service data flow information, and determining the service data flow information and corresponding radio resource information.

The embodiments of the present disclosure provide a method for controlling QoS. The method is applicable to a second network device, and includes:

sending, by the second network device, service data flow information and a corresponding QoS parameter.

The embodiments of the present disclosure provide a method for controlling QoS. The method is applied to a third network device, and includes:

determining a service data flow identifier corresponding to a service data flow template matched with data; and sending the data, wherein the service data flow identifier is carried in a data packet header of the data.

The embodiments of the present disclosure provide a method for controlling QoS. The method is applicable to a fourth network device, and includes:

determining a service data flow identifier, a service data flow template and a corresponding QoS parameter; and sending the service data flow identifier, the service data flow template, and the corresponding QoS parameter.

The embodiments of the present disclosure provide a terminal device. The terminal device includes:

a first determining module, configured to determine a service data flow to which data belongs;

a second determining module, configured to determine a radio resource corresponding to the service data flow according to service data flow information and corresponding radio resource information; and a first sending module, configured to send the data over the radio resource.

The embodiments of the present disclosure provide a network device. The network device includes:

a third receiving module, configured to receive service data flow information and a corresponding QoS parameter; and an allocating module, configured to allocate, according to the QoS parameter, a radio resource to a service data flow corresponding to the service data flow information, and determine the service data flow information and corresponding radio resource information.

The embodiments of the present disclosure provide a network device. The network device includes:

a fourth sending module, configured to send service data flow information and a corresponding QoS parameter.

The embodiments of the present disclosure provide a network device. The network device includes:

a fifth determining module, configured to determine a service data flow identifier corresponding to a service data flow template matched with data; and a seventh sending module, configured to send the data, wherein the service data flow identifier is carried in a data packet header of the data.

The embodiments of the present disclosure provide a network device. The network device includes:

a sixth determining module, configured to determine a service data flow identifier, a service data flow template and a corresponding QoS parameter; and an eighth sending module, configured to send the service data flow identifier, the service data flow template and the corresponding QoS parameter.

The embodiments of the present disclosure provide a terminal device. The terminal device includes a processor, a memory, and a transceiver. The memory is configured to store a computer program, and the processor is configured to call and run the computer program stored in the memory and control the transceiver to perform any of the methods described above.

The embodiments of the present disclosure provide a network device. The network device includes a processor, a memory and a transceiver. The memory is configured to store a computer program, and the processor is configured to call and run the computer program stored in the memory and control the transceiver to perform any of the methods described above.

The embodiments of the present disclosure provide a chip. The chip includes: a processor configured to call and run a computer program from a memory, to cause a device provided with the chip to perform any of the methods described above.

The embodiments of the present disclosure provide a computer-readable storage medium configured to store a computer program, wherein the computer program, when loaded and run by a computer, causes the computer to perform any of the methods described above.

The embodiments of the present disclosure provide a computer program product. The computer program product includes computer program instructions, wherein the computer program instructions, when loaded and executed by a computer, cause the computer to perform any method described above.

The embodiments of the present disclosure provide a computer program, wherein the computer program, when loaded and run by a computer, causes the computer to perform any of the methods described above.

DETAILED DESCRIPTION

Figure 1:
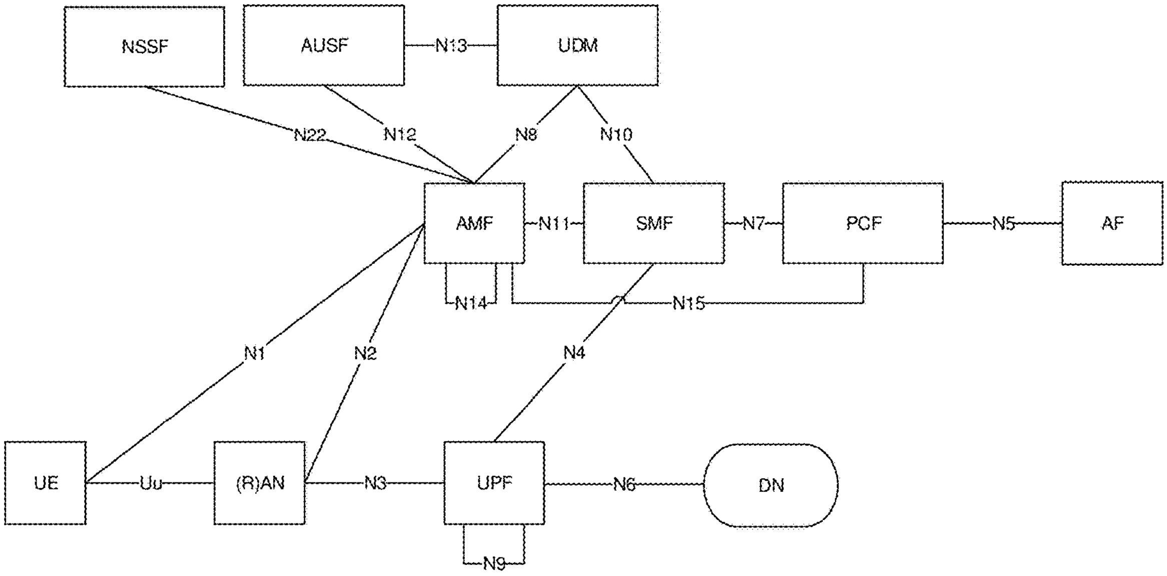
FIG. 1 exemplarily illustrates an architecture diagram of a 5G network system 100.

The technical solutions in the embodiments of the present disclosure will be described below in combination with the accompanying drawings in the embodiments of the present disclosure.

It should be noted that the terms "first" and "second" in the description of the embodiments of the present disclosure and claims and the above drawings are intended to distinguish similar objects, and are not necessarily intended to describe a specific order or sequence. Meanwhile, the objects described by the "first" and "second" may be the same or different.

The technical solutions according to the embodiments of the present disclosure are applicable to various communication systems, such as a global system of mobile communication (GSM), a code division multiple access (CDMA) system, a wideband code division multiple access (WCDMA) system, a general packet radio service (GPRS) system, a long term evolution (LTE) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunications system (UMTS), a wireless local area network (WLAN), a wireless fidelity (Wi-Fi) network, a 5th-generation (5G) system, or other communication systems.

Generally speaking, the number of connections supported by traditional communication systems is limited, and is easy to implement. However, with the development of communication technologies, mobile communication systems will support not only traditional communication, but also, for example, device to device (D2D) communication, machine to machine (M2M) communication, machine type communication (MTC), vehicle to vehicle (V2V) communication and the like. The embodiments of the present disclosure are also applicable to these communication systems.

The communication systems in the embodiments of the present disclosure are applicable to not only a carrier aggregation (CA) scenario, but also a dual connectivity (DC) scenario and a standalone (SA) network deployment scenario.

The embodiments of the present disclosure are not limited to applied frequency spectrums. For example, the embodiments of the present disclosure are applicable to both authorized frequency spectrums and unauthorized frequency spectrums.

Various embodiments of the present disclosure are described in combination with a network device and a terminal device. The terminal device may also be referred to as a user equipment (UE), an access terminal, a user unit, a user station, a mobile station, a mobile table, a remote station, a remote terminal, a mobile device, a user terminal, a terminal, a wireless communication device, a user agent, a user apparatus, or the like. The terminal device may be a station (ST) in the WLAN, and may also be a cellular phone, a cordless phone, a session initiation protocol (SIP) phone, a wireless local loop (WLL) station, a personal digital assistant (PDA) device, a handheld device with wireless communication function, a computing device or other processing devices connected to a wireless modem, a vehicle-mounted device, a wearable device, and the next-generation communication system, such as a terminal device in the NR network or a terminal device in a future evolved public land mobile network (PLMN).

By way of example instead of limitation, in the embodiments of the present disclosure, the terminal device may also be a wearable device. The wearable device, also known as a wearable smart device, is the general name of wearable devices, such as glasses, gloves, watches, clothing and shoes, which are intelligently designed and developed for daily wear by using wearable technologies. The wearable device is a portable device worn directly on the body or integrated into user's clothes or accessories. The wearable device is not only a type of hardware device, but also implements powerful functions by software support, data interaction, and cloud interaction. The wearable smart devices in a broad sense include devices such as smart watches or smart glasses which have full functionality and large size and are capable of implementing all or part of the functionality without relying on smart phones, and devices such as smart bracelets and smart jewelries for monitoring physical signs, which are dedicated to a specific type of application functions and need to be used in cooperation with other devices such as smart phones.

The network device may be a device for communicating with the mobile device. The network device may be an access point (AP) in the WLAN and a base transceiver station (BTS) in the GSM or CDMA, may be a node B (NB) in the WCDMA, and may also be an evolved node B (eNB or eNodeB) in the LTE, or a relay station or an access point, or a vehicle-mounted device, a wearable device, a network device (gNB) in the NR network, a network device in the future evolved PLMN, or the like.

In the embodiments of the present disclosure, the network device provides services for a cell, and the terminal device communicates with the network device over a transmission resource (such as a frequency domain resource, or a frequency spectrum resource) used by the cell. The cell may be a cell corresponding to the network device (for example, a base station), and the cell may belong to a macro base station or a base station corresponding to a small cell. The small cell here may include a metro cell, a micro cell, a pico cell, a femto cell, and the like. These small cells have the characteristics of small coverage and low transmission power, and are suitable for providing high-speed data transmission services.

FIG. 1 exemplarily illustrates an architecture diagram of a 5G network system 100. As shown in FIG. 1, the UE performs an access stratum connection with an access network (AN) over a Uu interface, to implement access stratum messages interaction and wireless data transmission. The UE establishes a non-access stratum (NAS) connection to an access and mobility management function (AMF) over an N1 interface to implement NAS messages interaction. In addition to mobility management for the UE, the AMF also forwards messages related to session management between the UE and a session management function (SMF). A policy control function (PCF) is a policy management function element in a core network, and formulates policies related to mobility management, session management, charging and the like for the UE. A user plane function (UPF) is a user plane-specific function element in the core network, and transmits data with an external data network over an N6 interface and transmits data with the AN over an N3 interface.

It should be understood that the terms "system" and "network" herein are often used interchangeably herein. Herein, the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that the "indication" mentioned in the embodiments of the present disclosure may be direct indication, indirect indication, or indication that there is an association relationship. For example, A indicates B may mean that A directly indicates B, for example, B is available through A; or may also mean that A indicates B indirectly, for example, A indicates C, and B is available through C; or may also mean an association relationship between A and B.

In the descriptions of the embodiments of the present disclosure, the term "corresponding" may mean a direct or indirect corresponding relationship between the two, or mean an association relationship between the two, or mean a relationship of indication and being indicated, configuration and being configured, or the like.

In order to facilitate the understanding of the technical solutions of the embodiments of the present disclosure, the related arts of the embodiments of the present disclosure are described below, and the following related arts may be freely combined with the technical solutions of the embodiments of the present disclosure as alternatives, which all belong to the protection scope of the embodiments of the present disclosure.

Figure 2:
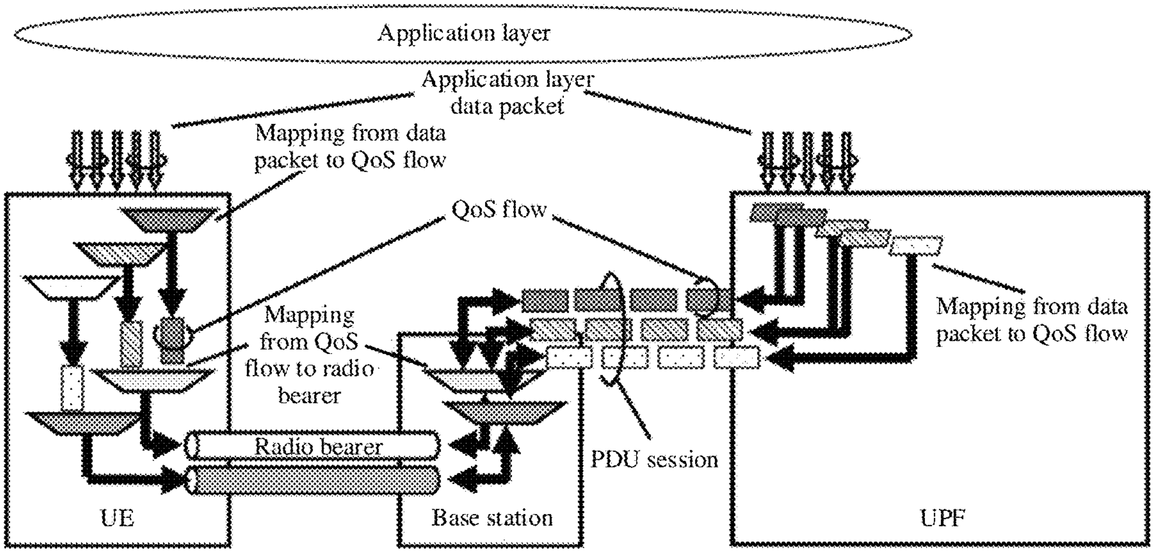
FIG. 2 exemplarily illustrates a QoS model of a 5G network.

FIG. 2 exemplarily illustrates a QoS model of a 5G network. As shown in FIG. 2, the QoS control in the 5G network is based on a granularity of a QoS flow, and the SMF binds service data flows to the QoS flow according to a PCC rule received from a PCF. One QoS flow may include multiple service data flows. These service data flows have the same transmission delay, transmission bit error rate and other requirements (represented by the same 5QI), but may have different bit rate requirements. When the SMF binds these service data flows to the QoS flow, the sum of bit rates of the service data flows is taken as a bit rate of the QoS flow. The SMF sends QoS requirements (including 5QI, bit rate information and the like) of the QoS flow to a base station, and the base station assures the QoS requirements of the QoS flow by scheduling radio resources.

It is the finest granularity that the base station identifies the QoS flow, and QoS is assured only at a QoS flow level. Since one QoS flow may include multiple service data flows, and the base station fails to identify the service data flows, considering that the bit rate information of the QoS flow is acquired by summing the bit rate information of multiple service data flows included therein, it is possible that the base station actually allocates too many resources to one service data flow, which exceeds the bit rate requirement, while allocating too few resources to another service data flow, which fails to meet the its bit rate requirement within the total bit rate range. It is apparent that the base station fails to assure differentiated QoS at a service data flow level. For example, data of video 1 and data of video 2 are both transmitted over the same QoS flow, with video 1 requiring a 2 Mbps bandwidth and video 2 requiring a 3 Mbps bandwidth. In the current network, where transmission delay requirements of video 1 and video 2 are the same, they may be transmitted over the same QoS flow, and the total bandwidth of this QoS flow is 5 Mbps. However, since the base station achieves flow identification at the QoS flow level, the base station may actually allocate only a 1 Mbps bandwidth to video 1 and a 4 Mbps bandwidth to video 2, resulting in that video 2 consumes the radio resource that should belong to video 1.

Figure 3:
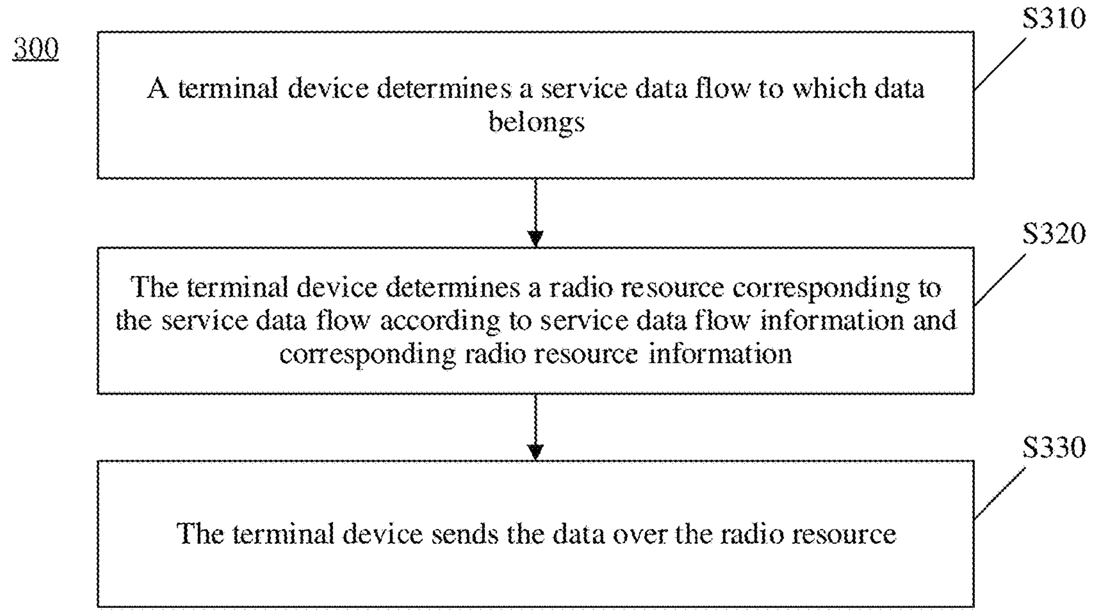
FIG. 3 is a schematic flowchart of a method 300 for controlling QoS according to some embodiments of the present disclosure.

Some embodiments of the present disclosure provide a method for controlling QoS. FIG. 3 is a schematic flowchart of a method 300 for controlling QoS according to some embodiments of the present disclosure. The method is optionally applicable to the system shown in FIG. 1, but not limited thereto. The method includes at least part of the following steps.

In S310, a terminal device determines a service data flow to which data belongs.

In S320, the terminal device determines a radio resource corresponding to the service data flow according to service data flow information and corresponding radio resource information.

In S330, the terminal device sends the data over the radio resource.

In some embodiments, the terminal device receives the service data flow information and the corresponding radio resource information from a base station.

Since the base station is capable of allocating an appropriate radio resource to the service data flow according to the information such as a QoS parameter of the service data flow, the radio resource used by the terminal device to send the data meets a QoS requirement of the service data flow to which the data belongs, thereby achieving the QoS control at a service data flow level.

In some embodiments, the service data flow information includes a service data flow identifier or a service data flow template.

The service data flow template may include at least one data packet filter. The service data flow template may also be referred to as the service data flow filter, and is the characteristic of a user plane data packet header corresponding to the service data flow. For example, for IP-type data, an IP source address, a target IP address, a source port number, a target port number and the like may be included. For Ethernet-type data, a source MAC address, a target MAC address and the like may be included.

In some embodiments, the radio resource information may include a radio bearer identifier.

Corresponding to the situation that the service data flow information includes the service data flow template, the way for the terminal device to determine the service data flow to which the data belongs may include: determining, by the terminal device, the service data flow template matched with the data.

Further, the terminal device may receive the service data flow template and the corresponding service data flow identifier from a second network device. The second network device may include an SMF.

Corresponding to the situation that the service data flow information includes the service data flow identifier, on the premise that the terminal device receives the service data flow template and the corresponding service data flow identifier, determining, by the terminal device, the service data flow to which the data belongs may include: determining, by the terminal device, the service data flow identifier corresponding to the service data flow template matched with the data.

In addition, for the situation that the terminal device receives the service data flow identifier and the corresponding radio resource information from the base station, the terminal device may receive a set of service data flow identifiers and the corresponding radio resource information from the base station.

Specifically, the set of service data flow identifiers is expressed by at least one of:

at least two service data flow identifiers; or a value range of the service data flow identifiers.

For example, where multiple service data flow identifiers correspond to the same radio resource information, the terminal device may receive a signaling, including the set formed by these service data flow identifiers and the radio resource information, with no need to receive multiple signaling for respective service data flow identifiers. Therefore, the signaling overhead is saved.

For example, the signaling received by the terminal device may take the following form:

{[service data flow identifier 1, service data flow identifier 5, service data flow identifier 10], radio resource information}; or {range of service data flow identifiers (for example, 1-m), radio resource information}.

With reference to the accompanying drawings, the present disclosure will be described in detail with specific embodiments.

Embodiment 1

Figure 4:
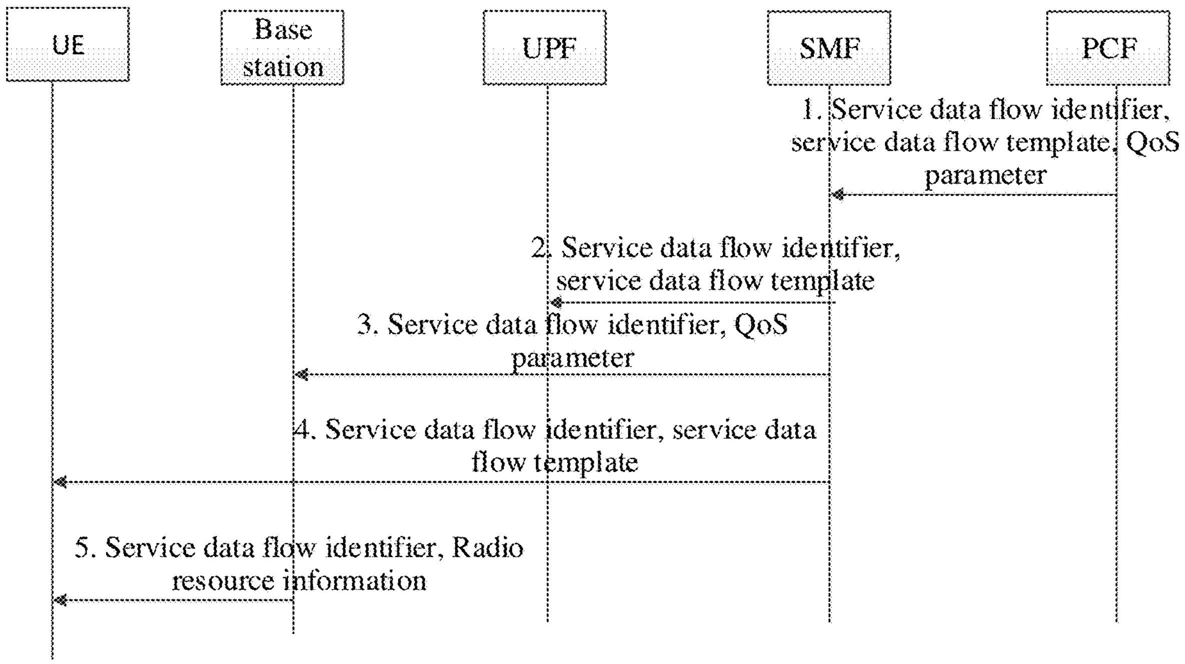
FIG. 4 is a schematic implementation diagram of Embodiment 1 of the present disclosure.

FIG. 4 is a schematic implementation diagram of Embodiment 1 of the present disclosure.

In this embodiment, the PCF determines the service data flow identifier, the QoS parameter corresponding to the service data flow, and the service data flow template. The QoS parameter includes but is not limited to a transmission delay requirement, and/or a bit error rate requirement, and/or a QoS index, and/or a bit rate requirement. The QoS index may be configured to refer to index values of the transmission delay requirement and the bit error rate requirement. For example, with QoS index=1, it refers to the QoS requirements of 100 ms transmission delay and 10-2 bit error rate. The service data flow template, also known as the service data flow filter, may be the characteristic of the user plane data packet header corresponding to the service data flow. For example, for the IP-type data, an IP source address, a target IP address, a source port number, a target port number and the like may be included. For the Ethernet-type data, a source MAC address, a target MAC address and the like may be included.

In step 1 of FIG. 4, the PCF sends the service data flow identifier, the QoS parameter corresponding to the service data flow and the service data flow template to the SMF.

In steps 2 to 4 of FIG. 4, the SMF sends the service data flow identifier and a QoS parameter corresponding to the service data flow to the base station, sends the service data flow identifier and the corresponding service data flow template for matching uplink service flow data to the UE, and sends the service data flow identifier and the corresponding service data flow template to the UPF. Steps 2 to 4 are not subject to a specific execution sequence.

In step 5 of FIG. 4, the base station allocates an appropriate radio resource to the service data flow according to the QoS requirements of the service data flow, and sends the service data flow identifier and the corresponding radio resource information to the UE. The radio resource information may include a radio bearer identifier.

For downlink data, according to the service data flow identifier received in step 2 and the corresponding service data flow template, the UPF determines the service data flow identifier corresponding to the service data flow template matched with the data (that is, to determine the service data flow to which the data belongs); sends the data, wherein the service data flow identifier is carried in a data packet header of the data. The base station receives the data and determines the service data flow to which the data belongs (for example, by identifying the service data flow identifier in the data packet header of the data); determines the radio resource corresponding to the service data flow according to the service data flow information and the corresponding radio resource information determined in step 5; and sends the data over the radio resource, thereby achieving QoS control of the data.

For uplink data, according to the service data flow identifier and the corresponding service data flow template received in step 4, the UE determines the service data flow identifier corresponding to the service data flow template matched with the data (that is, to determine the service data flow to which the data belongs). Then, the UE determines the radio resource corresponding to the radio data flow according to the service data flow identifier and the corresponding radio resource information received in step 5, and sends the data to the base station over the radio resource, thereby achieving QoS control of the data.

In the downlink data sending and uplink data sending processes, the data is sent over the radio resource corresponding to the service data flow to which the data belongs, thereby ensuring the QoS control of the service data flow.

Embodiment 2

Figure 5:
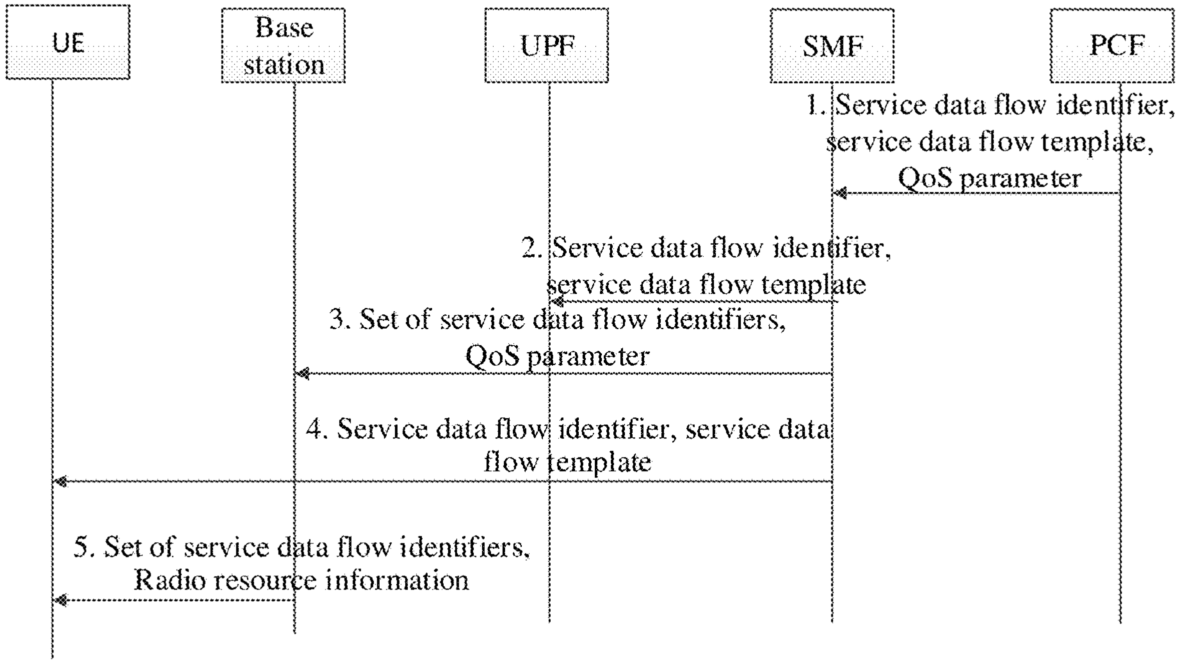
FIG. 5 is a schematic implementation diagram of Embodiment 2 of the present disclosure.

FIG. 5 is a schematic implementation diagram of Embodiment 2 of the present disclosure.

This embodiment differs from Embodiment 1 in that the service data flow identifiers sent in steps 3 and 5 may be a set of service data flow identifiers. For example, where multiple service data flows have the same QoS parameter, the service data flow information and the corresponding QoS parameter sent to the base station by the SMF in step 3 may take the following form:

{[service data flow identifier 1, service data flow identifier 5, service data flow identifier 10], QOS parameter}.

That is, at least two service data flow identifiers and the QoS parameter corresponding to these service data flow identifiers jointly may be included.

Alternatively, the following form is taken:

{range of service data flow identifiers (for example, 1-m), QoS parameter}.

That is, the range to which at least two service data flows corresponding to the same QoS parameter belong may be included.

Similarly, the set of service data flow identifiers and the corresponding radio resource information sent by the base station to the UE in step 5 may also take the following form:

{[service data flow identifier 1, service data flow identifier 5, service data flow identifier 10], QoS parameter}; or {range of service data flow identifiers (for example, 1-m), radio resource information}.

In this way, the multiple service data flow identifiers corresponding to the same QoS parameter may be combined into the same signaling to be sent, or the multiple service data flow identifiers corresponding to the same radio resource identifier may be combined into the same signaling to be sent, thereby saving the signaling overhead.

Embodiment 3

Figure 6:
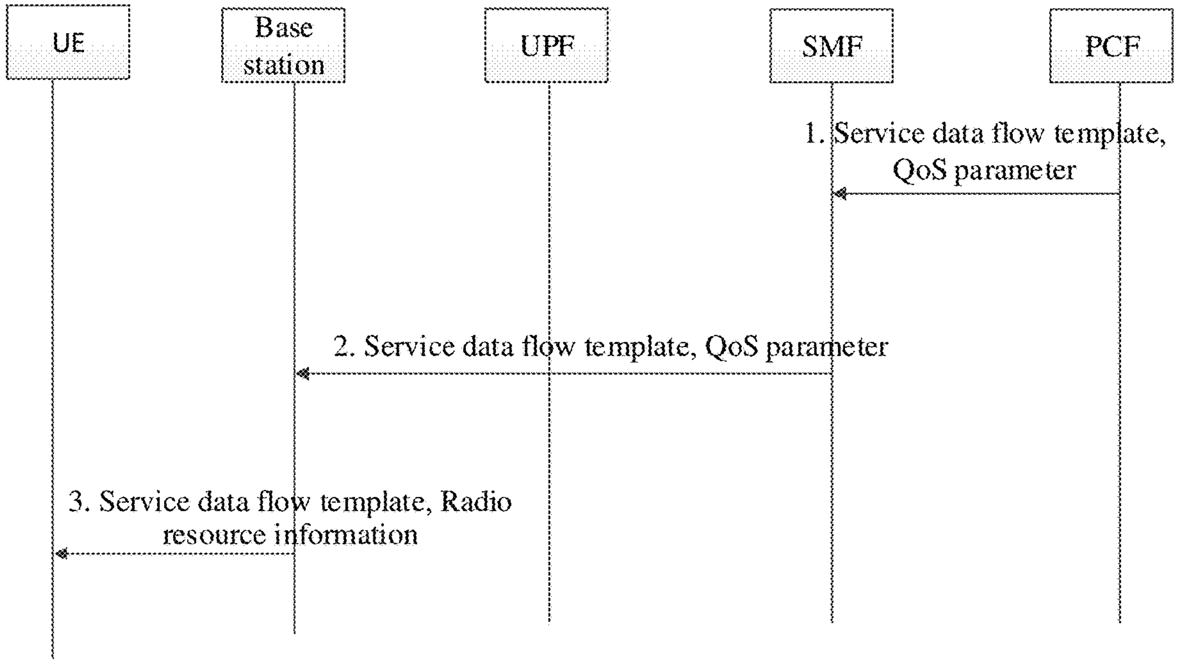
FIG. 6 is a schematic implementation diagram of Embodiment 3 of the present disclosure.

FIG. 6 is a schematic implementation diagram of Embodiment 3 of the present disclosure.

In this embodiment, the PCF determines the QoS parameter corresponding to the service data flow and the service data flow template. Details of the QoS parameter and the service data flow template are the same as those in Embodiment 1, which are not repeated herein.

In step 1 of FIG. 6, the PCF sends the QoS parameter corresponding to the service data flow, and the service data flow template to the SMF.

In step 2 of FIG. 6, the SMF sends the service data flow template and the QoS parameter corresponding to the service data flow to the base station.

In step 3 of FIG. 6, the base station allocates an appropriate radio resource to the service data flow according to the QoS requirements of the service data flow, and sends the service data flow template and the corresponding radio resource information to the UE. The radio resource information may include a radio bearer identifier.

For downlink data, the UPF sends the downlink data to the base station. The base station matches service data according to the service data flow template (that is, determines the service data flow to which the data belongs), determines the radio resource corresponding to the service data flow according to the service data flow template and the corresponding radio resource information determined in step 3; and sends the data over the radio resource, thereby achieving QoS control of the data.

For uplink data, according to the service data flow template and the corresponding radio resource information received in step 3, the UE determines the radio resource information corresponding to the service data flow template matched with the data, and sends the data to the base station over the radio resource, thereby achieving QoS control of the data.

In this embodiment, the base station has the capability of determining the service data flow template matched with the data. Therefore, it is unnecessary to add the service data flow identifier in the data packet header of the downlink data by the UPF, and it is also unnecessary to express the service data flow information using the service data flow identifier.

In summary, in the embodiments of the present disclosure, according to the QoS parameter corresponding to the service data flow, the appropriate radio resource is allocated to the service data flow; and when the service data flow to which the data belongs is identified, the data is sent over the radio resources corresponding to the service data flow, thereby achieving QoS control at the service data flow level.

The embodiments of the present disclosure do not limit the application scenarios, and the embodiments of the present disclosure are applicable to 5G networks, 4G networks, and future 3rd generation partnership project (3GPP) networks.

Figure 7:
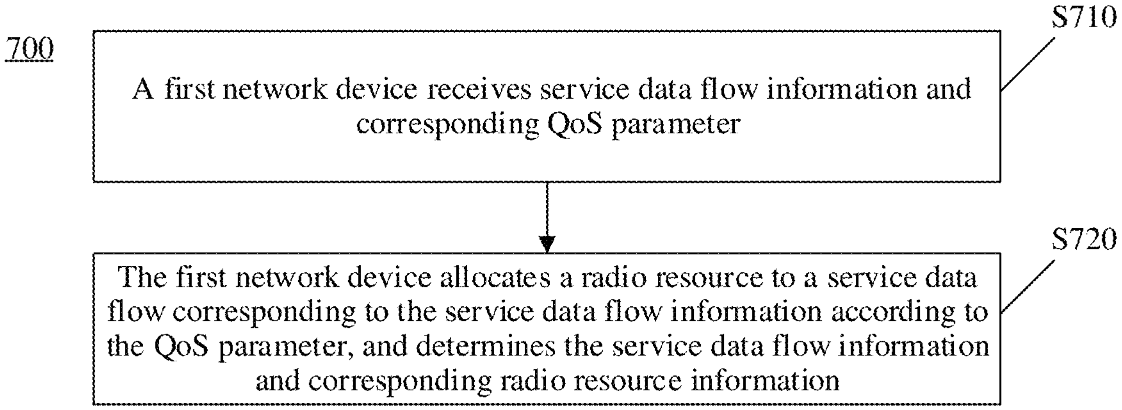
FIG. 7 is a schematic flowchart of a method 700 for controlling QoS according to some embodiments of the present disclosure.

In combination with the above embodiments, the present disclosure also provides a method for controlling QoS. FIG. 7 is a schematic flowchart of a method 700 for controlling QoS according to some embodiments of the present disclosure. The method may be optionally applied to the system shown in FIG. 1, but not limited thereto. The method includes at least part of the following steps.

In S710, a first network device receives service data flow information and a corresponding QOS parameter.

In S720, the first network device allocates a radio resource to a service data flow corresponding to the service data flow information according to the QoS parameter, and determines the service data flow information and corresponding radio resource information.

The first network device may include a base station.

In some embodiments, the method may further include: sending, by the first network device, the service data flow information and the corresponding radio resource information. For example, the base station sends the service data flow information and the corresponding radio resource information to the UE, such that the UE sends uplink data over the radio resource allocated to the service data flow.

The radio resource information may include a radio bearer identifier.

In some embodiments, the service data flow information includes a service data flow identifier or a service data flow template.

For example, the service data flow template may include at least one data packet filter.

In some embodiments, the method may further include:

determining, by the first network device, the service data flow to which data belongs;

determining the radio resource corresponding to the service data flow according to the service data flow information and the corresponding radio resource information; and sending the data over the radio resource.

In some embodiments, determining, by the first network device, the service data flow to which the data belongs may include: determining, by the first network device, the service data flow identifier in a data packet header of the data.

The service data flow identifier in the data packet header may be determined and added by the UPF according to the service data flow template and its corresponding service data flow identifier after determining the service data flow template matched with the downlink data.

In some embodiments, determining, by the first network device, the service data flow to which the data belongs may include: determining, by the first network device, the service data flow template matched with the data.

In some embodiments, the first network device receives the service data flow information and the corresponding QoS parameter from a second network device, wherein the second network device may include an SMF.

In some embodiments, receiving, by the first network device, the service data flow information and the corresponding QoS parameter may include: receiving, by the first network device, a set of service data flow identifiers and the corresponding QoS parameter.

In some embodiments, sending, by the first network device, the service data flow information and the corresponding radio resource information may include: sending, by the first network device, the set of service data flow identifiers and the corresponding radio resource information.

In some embodiments, the set of service data flow identifiers is expressed by at least one of:

at least two service data flow identifiers; or a value range of the service data flow identifiers.

Figure 8:
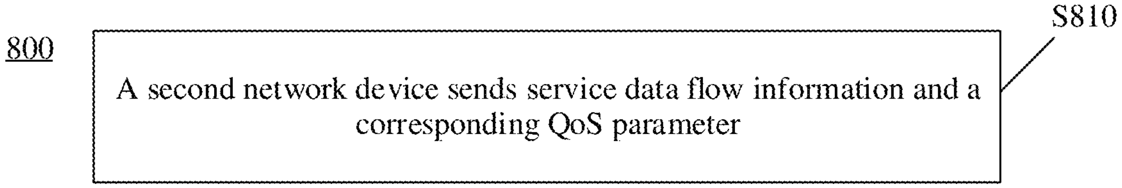
FIG. 8 is a schematic flowchart of a method 800 for controlling QoS according to some embodiments of the present disclosure.

In combination with the above embodiments, the present disclosure also provides a method for controlling QoS. FIG. 8 is a schematic flowchart of a method 800 for controlling QoS according to some embodiments of the present disclosure. The method is optionally applicable to the system shown in FIG. 1, but not limited thereto. The method includes at least part of the following contents.

In S810, a second network device sends service data flow information and a corresponding QoS parameter.

The second network device may include an SMF.

In some embodiments, the service data flow information includes a service data flow identifier or a service data flow template.

In some embodiments, the service data flow template includes at least one data packet filter.

In some embodiments, the method may further include: receiving the service data flow identifier, the service data flow template and the corresponding QoS parameter from a fourth network device.

In some embodiments, the method may further include: sending the service data flow template and the corresponding service data flow identifier to a third network device.

In some embodiments, the method may further include: sending the service data flow template and the corresponding service data flow identifier to a terminal device.

In some embodiments, the method may further include: receiving the service data flow template and the corresponding QoS parameter from the fourth network device.

In some embodiments, the third network device includes a UPF.

In some embodiments, the fourth network device includes a PCF.

Figure 9:
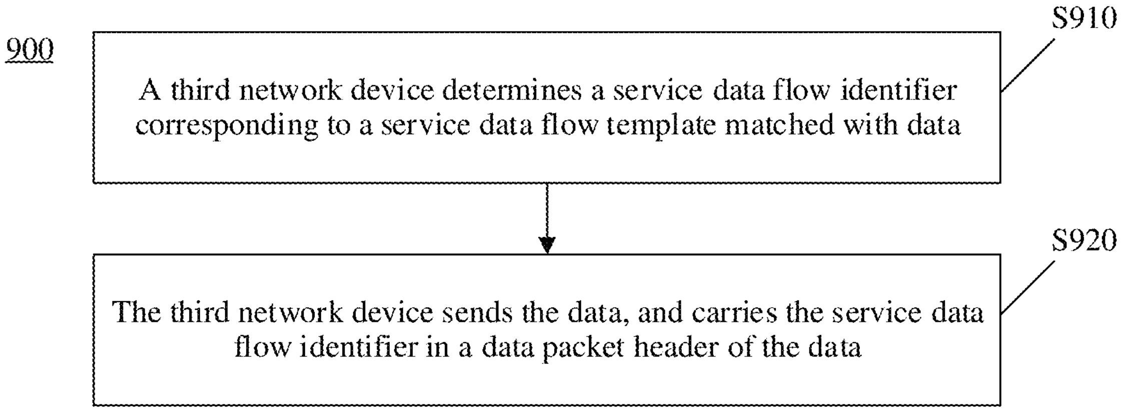
FIG. 9 is a schematic flowchart of a method 900 for controlling QoS according to some embodiments of the present disclosure.

In combination with the above embodiments, some embodiments of the present disclosure provide a method for controlling QoS. FIG. 9 is a schematic flowchart of a method 900 for controlling QoS according to some embodiments of the present disclosure. The method is optionally applicable to the system shown in FIG. 1, but not limited thereto. The method may be applicable to a third network device, and includes at least part of the following steps.

In S910, the third network device determines a service data flow identifier corresponding to a service data flow template matched with data.

In S920, the third network device sends the data, wherein the service data flow identifier is carried in a data packet header of the data.

The third network device may include a UPF.

In some embodiments, the method may further include: receiving the service data flow template and the corresponding service data flow identifier from a second network device. The second network device may include an SMF.

In some embodiments, the service data flow template may include at least one data packet filter.

Figure 10:
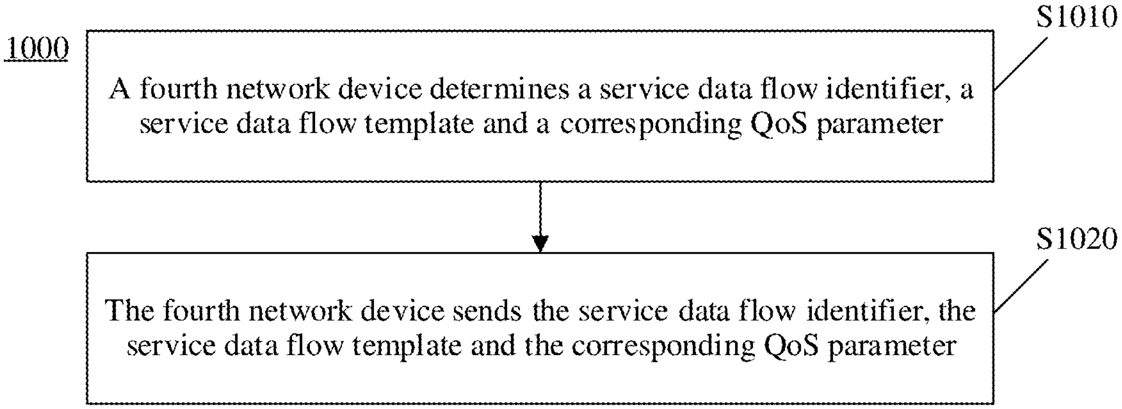
FIG. 10 is a schematic flowchart of a method 1000 for controlling QoS according to some embodiments of the present disclosure.

In combination with the above embodiments, the present disclosure also provides a method for controlling QoS. FIG. 10 is a schematic flowchart of a method 1000 for controlling QoS according to some embodiments of the present disclosure. The method is optionally applicable to the system shown in FIG. 1, but not limited thereto. The method may be applicable to a fourth network device, and includes at least part of the following steps.

In S1010, the fourth network device determines a service data flow identifier, a service data flow template, and a corresponding QoS parameter.

In S1020, the fourth network device sends the service data flow identifier, the service data flow template and the corresponding QoS parameter.

The service data flow identifier, the service data flow template and the corresponding QoS parameter may be sent to a second network device.

In some embodiments, the service data flow template includes at least one data packet filter.

In some embodiments, the second network device includes an SMF.

In some embodiments, the fourth network device includes a PCF.

Figure 11:
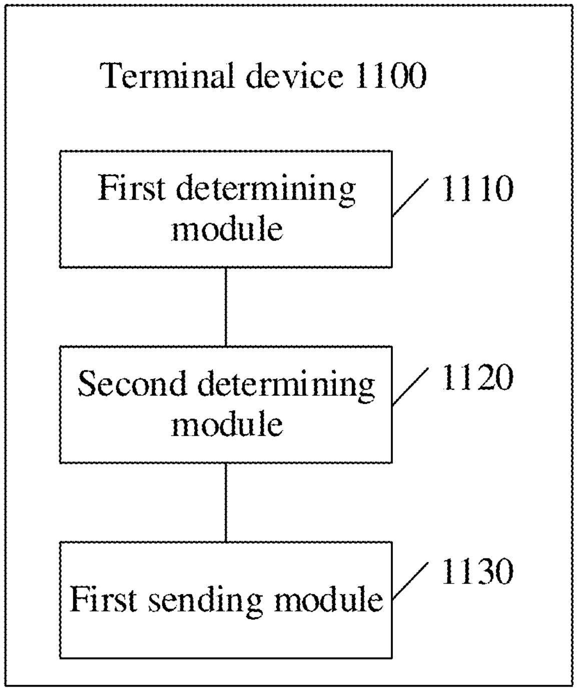
FIG. 11 is a schematic structural diagram of a terminal device 1100 according to some embodiments of the present disclosure.

Some embodiments of the present disclosure provide a terminal device. FIG. 11 is a structural schematic diagram of a terminal device 1100 according to some embodiments of the present disclosure. The terminal device includes:

a first determining module 1110, configured to determine a service data flow to which data belongs;

a second determining module 1120, configured to determine a radio resource corresponding to the service data flow according to service data flow information and corresponding radio resource information; and a first sending module 1130, configured to send the data over the radio resource.

Figure 12:
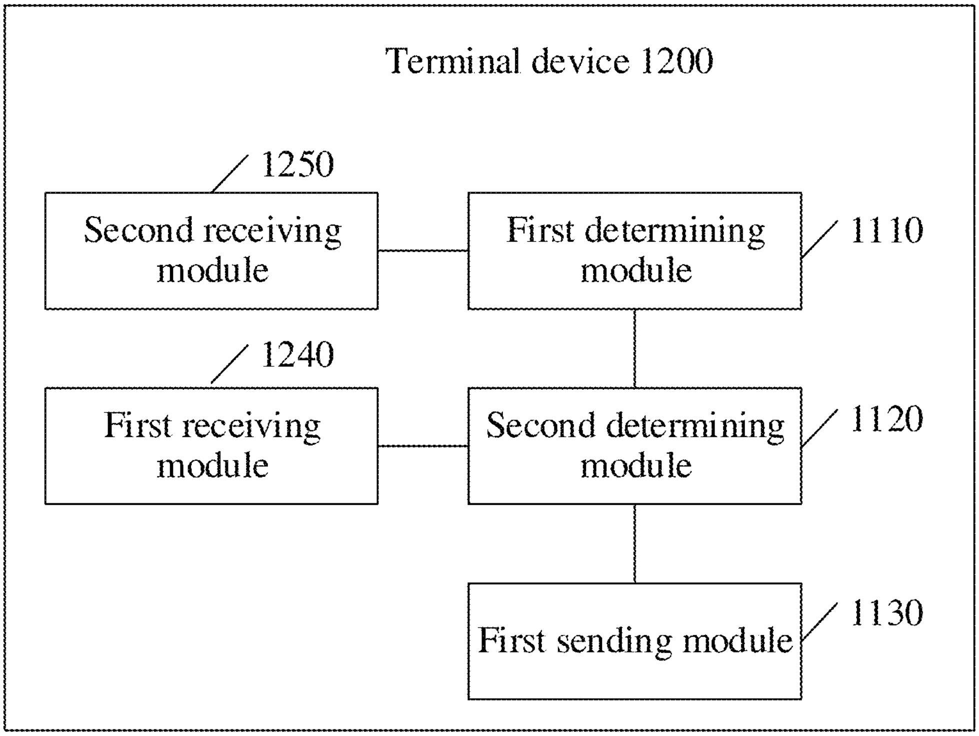
FIG. 12 is a schematic structural diagram of a terminal device 1200 according to some embodiments of the present disclosure.

Some embodiments of the present disclosure provide a terminal device. FIG. 12 is a schematic structural diagram of the terminal device 1200 according to some embodiments of the present disclosure. The terminal device includes a first determining module 1110, a second determining module 1120, a first sending module 1130, and a first receiving module 1240.

The first receiving module 1240 is configured to receive service data flow information and corresponding radio resource information from a base station.

In some embodiments, the service data flow information includes a service data flow identifier or a service data flow template.

In some embodiments, the service data flow template includes at least one data packet filter.

In some embodiments, the first determining module 1110 is configured to determine the service data flow template matched with data.

As shown in FIG. 12, the terminal device may further include:

a second receiving module 1250, configured to receive the service data flow template and the corresponding service data flow identifier from a second network device.

The second network device may include an SMF.

In some embodiments, the first determining module 1110 is configured to determine the service data flow identifier corresponding to the service data flow template matched with the data.

In some embodiments, the second receiving module 1250 receives the service data flow template and the corresponding service data flow identifier from the SMF.

In some embodiments, the first receiving module 1240 is configured to receive a set of service data flow identifiers and the corresponding radio resource information from the base station.

In some embodiments, the set of service data flow identifiers is expressed by at least one of:

at least two service data flow identifiers; or a value range of the service data flow identifiers.

In some embodiments, the radio resource information includes a radio bearer identifier.

It should be understood that the above and other operations and/or functions of the modules in the terminal device according to the embodiments of the present disclosure are respectively intended to perform the corresponding flows of the terminal device in the method 300 of FIG. 3, which are not repeated herein for brevity.

Figure 13:
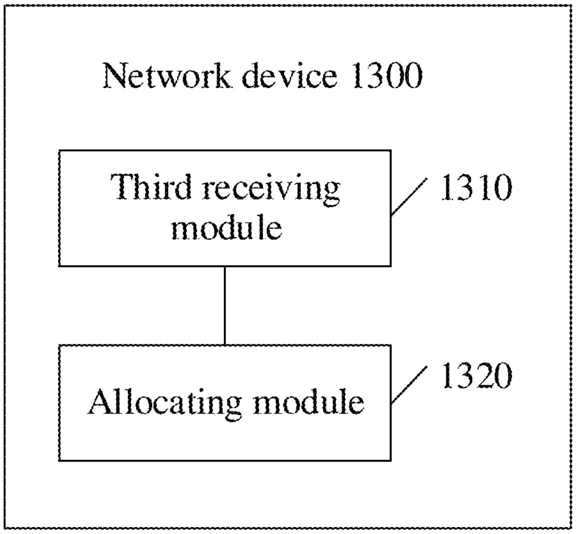
FIG. 13 is a schematic structural diagram of a network device 1300 according to some embodiments of the present disclosure.

Some embodiments of the present disclosure provide a network device. FIG. 13 is a schematic structural diagram of a network device 1300 according to some embodiments of the present disclosure. The network device includes:

a third receiving module 1310, configured to receive service data flow information and corresponding QoS parameter; and an allocating module 1320, configured to allocate a radio resource to a service data flow corresponding to the service data flow information according to the QoS parameter, and determine the service data flow information and corresponding radio resource information.

Figure 14:
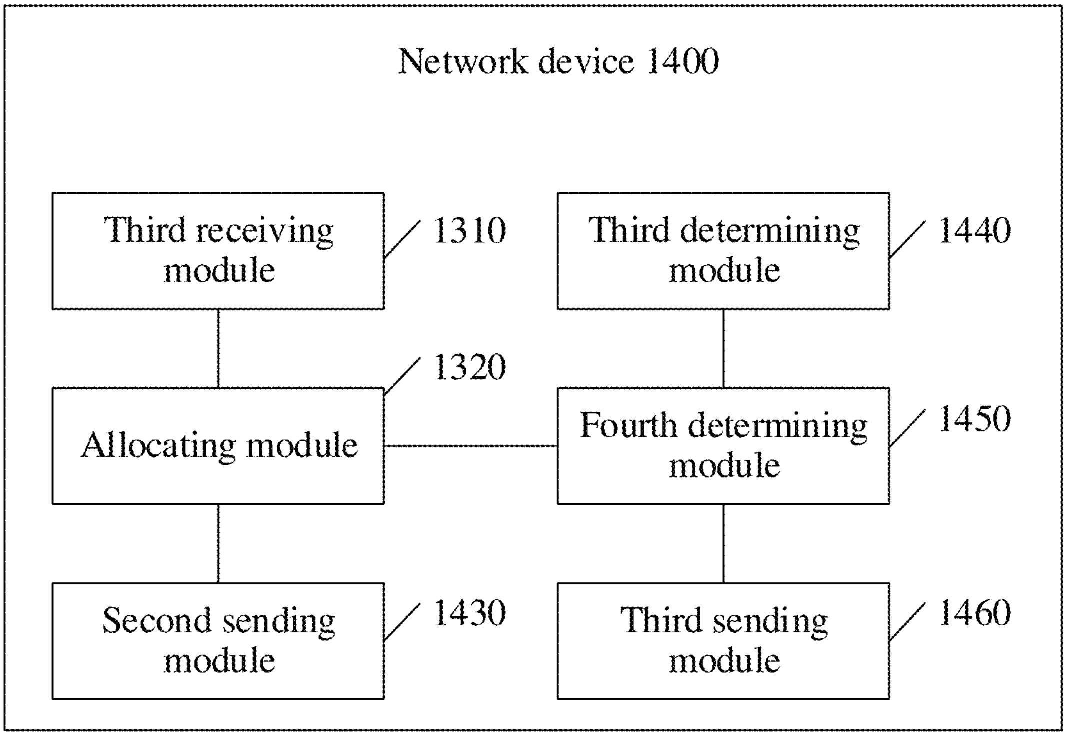
FIG. 14 is a schematic structural diagram of a network device 1400 according to some embodiments of the present disclosure.

Some embodiments of the present disclosure provide a network device. FIG. 14 is a schematic structural diagram of a network device 1400 according to some embodiments of the present disclosure. The network device includes a third receiving module 1310, an allocating module 1320, and a second sending module 1430.

The second sending module 1430 is configured to send service data flow information and corresponding radio resource information.

In some embodiments, the service data flow information includes a service data flow identifier or a service data flow template.

In some embodiments, the service data flow template includes at least one data packet filter.

As shown in FIG. 14, in some embodiments, the network device further includes:

a third determining module 1440, configured to determine a service data flow to which data belongs;

a fourth determining module 1450, configured to determine a radio resource corresponding to the service data flow according to the service data flow information and the corresponding radio resource information; and a third sending module 1460, configured to send the data over the radio resource.

In some embodiments, the third determining module 1440 is configured to determine the service data flow identifier in a data packet header of the data.

In some embodiments, the third determining module 1440 is configured to determine the service data flow template matched with the data.

In some embodiments, the third receiving module 1310 is configured to receive the service data flow information and corresponding QoS parameter from a second network device.

The second network device may include an SMF.

In some embodiments, the third receiving module 1310 is configured to receive a set of service data flow identifiers and the corresponding QoS parameter.

In some embodiments, the second sending module 1430 is configured to send the set of service data flow identifiers and the corresponding radio resource information.

In some embodiments, the set of service data flow identifiers is expressed by at least one of:

at least two service data flow identifiers; or a value range of the service data flow identifiers.

In some embodiments, the radio resource information includes a radio bearer identifier.

In some embodiments, the network device includes a base station.

It should be understood that the above and other operations and/or functions of the modules in the network device according to the embodiments of the present disclosure are respectively intended to perform the corresponding flows of the network device in the method 700 of FIG. 7, which are not repeated herein for brevity.

Figure 15:
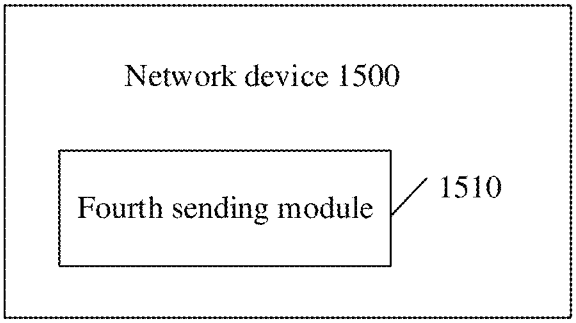
FIG. 15 is a schematic structural diagram of a network device 1500 according to some embodiments of the present disclosure.

Some embodiments of the present disclosure provide a network device. FIG. 15 is a schematic structural diagram of a network device 1500 according to some embodiments of the present disclosure. The network device includes:

a fourth sending module 1510, configured to send service data flow information and corresponding QoS parameter.

In some embodiments, the service data flow information includes a service data flow identifier or a service data flow template.

In some embodiments, the service data flow template includes at least one data packet filter.

Figure 16:
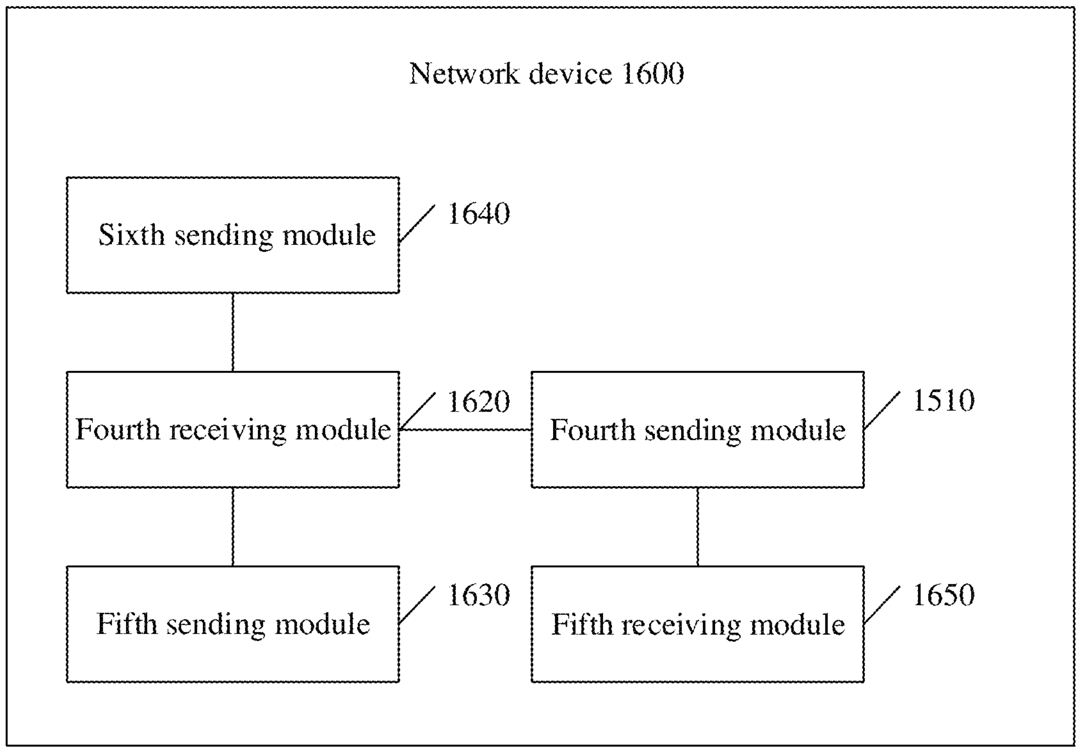
FIG. 16 is a schematic structural diagram of a network device 1600 according to some embodiments of the present disclosure.

Some embodiments of the present disclosure also provide a network device. FIG. 16 is a schematic structural diagram of a network device 1600 according to some embodiments of the present disclosure. The network device includes a fourth sending module 1510 and a fourth receiving module 1620.

The fourth receiving module 1620 is configured to receive a service data flow identifier, a service data flow template and corresponding QoS parameter from a fourth network device.

As shown in FIG. 16, in some embodiments, the network device further includes:

a fifth sending module 1630, configured to send the service data flow template and the corresponding service data flow identifier to a third network device.

As shown in FIG. 16, in some embodiments, the network device further includes:

a sixth sending module 1640, configured to send the service data flow template and the corresponding service data flow identifier to a terminal device.

As shown in FIG. 16, in some embodiments, the network device further includes:

a fifth receiving module 1650, configured to receive the service data flow template and the corresponding QoS parameter from the fourth network device.

In some embodiments, the network device includes an SMF.

In some embodiments, the fourth network device includes a PCF.

In some embodiments, the third network device includes a UPF.

It should be understood that the above and other operations and/or functions of the modules in the network device according to the embodiments of the present disclosure are respectively intended to perform the corresponding flows of the SMF in the method 800 of FIG. 8, which are not repeated herein for brevity.

Figure 17:
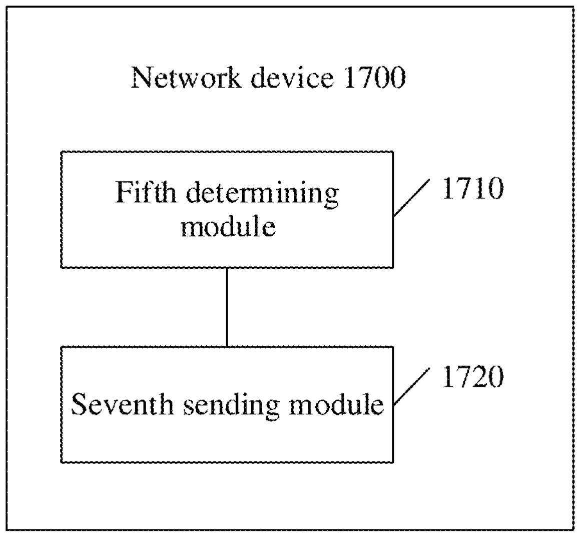
FIG. 17 is a schematic structural diagram of a network device 1700 according to some embodiments of the present disclosure.

Some embodiments of the present disclosure provide a network device. FIG. 17 is a schematic structural diagram of a network device 1700 according to some embodiments of the present disclosure. The network device includes:

a fifth determining module 1710, configured to determine a service data flow identifier corresponding to a service data flow template matched with data; and a seventh sending module 1720, configured to send the data, wherein the service data flow identifier is carried in a data packet header of the data.

Figure 18:
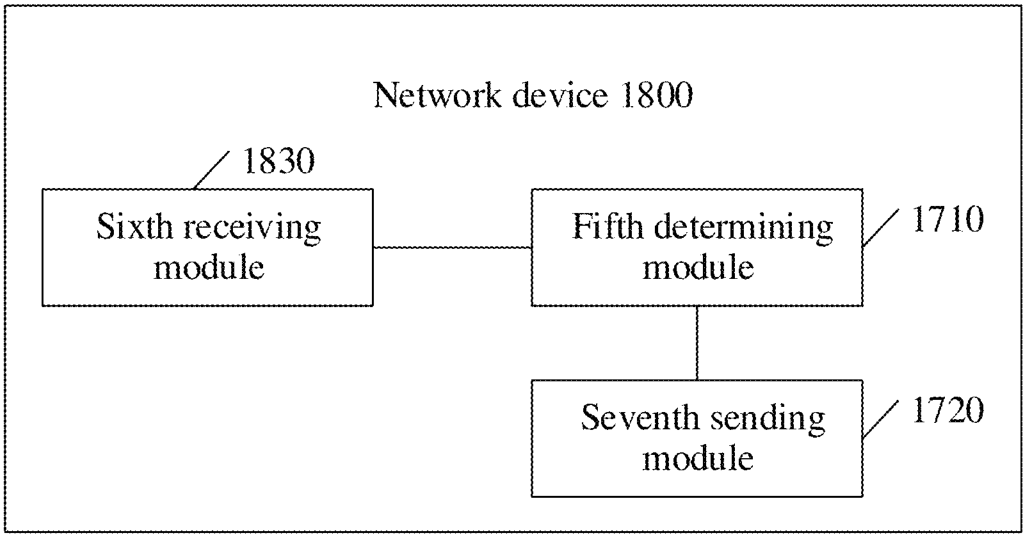
FIG. 18 is a schematic structural diagram of a network device 1800 according to some embodiments of the present disclosure.

Some embodiments of the present disclosure also provide a network device, and FIG. 18 is a schematic structural diagram of a network device 1800 according to some embodiments of the present disclosure. The network device includes a fifth determining module 1710, a seventh sending module 1720, and a sixth receiving module 1830.

The sixth receiving module 1830 is configured to receive a service data flow template and a corresponding service data flow identifier from a second network device.

The second network device may include an SMF.

In some embodiments, the service data flow template includes at least one data packet filter.

In some embodiments, the network device includes a UPF.

It should be understood that the above and other operations and/or functions of the modules in the network device according to the embodiments of the present disclosure are respectively intended to perform the corresponding flows of the UPF in the method 900 of FIG. 9, which are not repeated herein for brevity.

Figure 19:
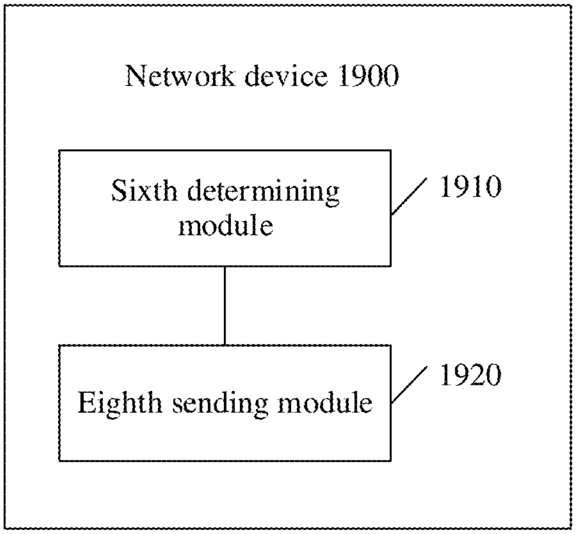
FIG. 19 is a schematic structural diagram of a network device 1900 according to some embodiments of the present disclosure.

Some embodiments of the present disclosure provide a network device. FIG. 19 is a schematic structural diagram of a network device 1900 according to some embodiments of the present disclosure. The network device includes:

a sixth determining module 1910, configured to determine a service data flow identifier, a service data flow template and corresponding QoS parameter; and an eighth sending module 1920, configured to send the service data flow identifier, the service data flow template and the corresponding QoS parameter.

In some embodiments, the eighth sending module 1920 is configured to send the service data flow identifier, the service data flow template and the corresponding QoS parameter to a second network device.

The second network device may include an SMF.

In some embodiments, the service data flow template includes at least one data packet filter.

In some embodiments, the network device includes a PCF.

It should be understood that the above and other operations and/or functions of the modules in the network device according to the embodiments of the present disclosure are respectively intended to perform the corresponding flows of the PCF in the method 1000 of FIG. 10, which are not repeated herein for brevity.

It should be noted that the functions of respective modules (sub-modules, units or components, or the like) in the terminal devices and the network devices according to the embodiments of the present disclosure may be implemented by different modules (sub-modules, units or components, or the like) or by the same module (sub-module, unit or component, or the like). For example, the first receiving module and the second receiving module may be different modules or the same module and are both capable of implementing the corresponding functions in the embodiments of the present disclosure. In addition, the sending modules and the receiving modules in the embodiments of the present disclosure may be practiced by a transceiver of the device, and part or all of the rest modules may be practiced by a processor of the device.

Figure 20:
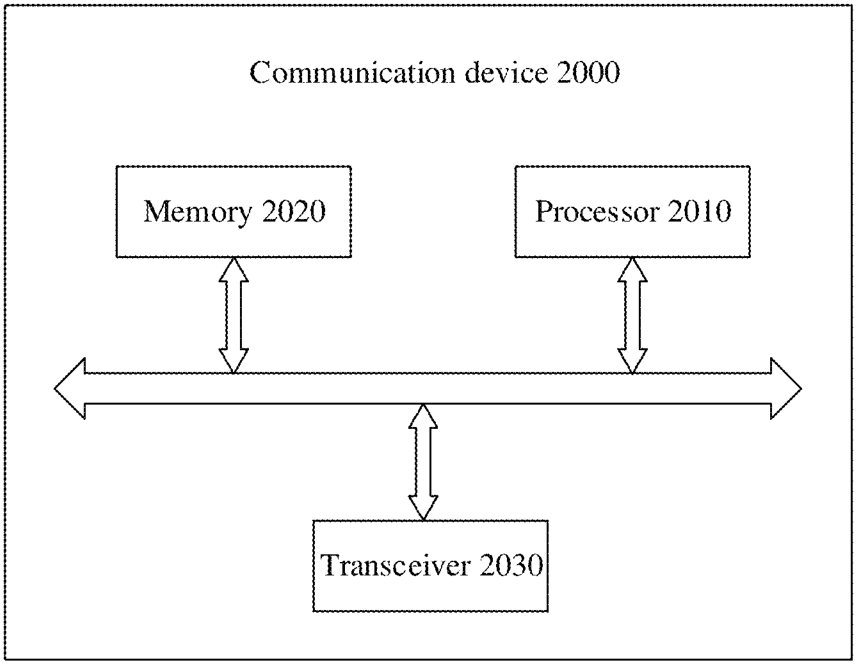
FIG. 20 is a schematic structural diagram of a communication device 2000 according to some embodiments of the present disclosure.

FIG. 20 is a schematic structural diagram of a communication device 2000 according to some embodiments of the present disclosure. The communication device 2000 includes a processor 2010, and the processor 2010 is capable of calling and running a computer program from a memory to perform the method in the embodiments of the present disclosure.

In some embodiments, as shown in FIG. 20, the communication device 2000 may further include a memory 2020. The processor 2010 is capable of calling and running a computer program from the memory 2020 to perform the method in the embodiments of the present disclosure.

The memory 2020 may be a separate device independent of the processor 2010 or integrated in the processor 2010.

In some embodiments, as shown in FIG. 20, the communication device 2000 may further include a transceiver 2030. The processor 2010 may control the transceiver 2030 to communicate with other devices, and specifically, may send information or data to other devices or receive the information or data sent by other devices.

The transceiver 2030 may include a transmitter and a receiver. The transceiver 2030 may further include antennas, and the number of the antennas may be one or more.

In some embodiments, the communication device 2000 may be a terminal device according to the embodiments of the present disclosure. The communication device 2000 is capable of performing the corresponding flows of the terminal device in each method according to the embodiments of the present disclosure, which are not repeated herein for brevity.

In some embodiments, the communication device 2000 may be a network device according to the embodiments of the present disclosure. The communication device 2000 is capable of performing the corresponding flows of the network device in each method according to the embodiments of the present disclosure, which are not repeated herein for brevity.

Figure 21:
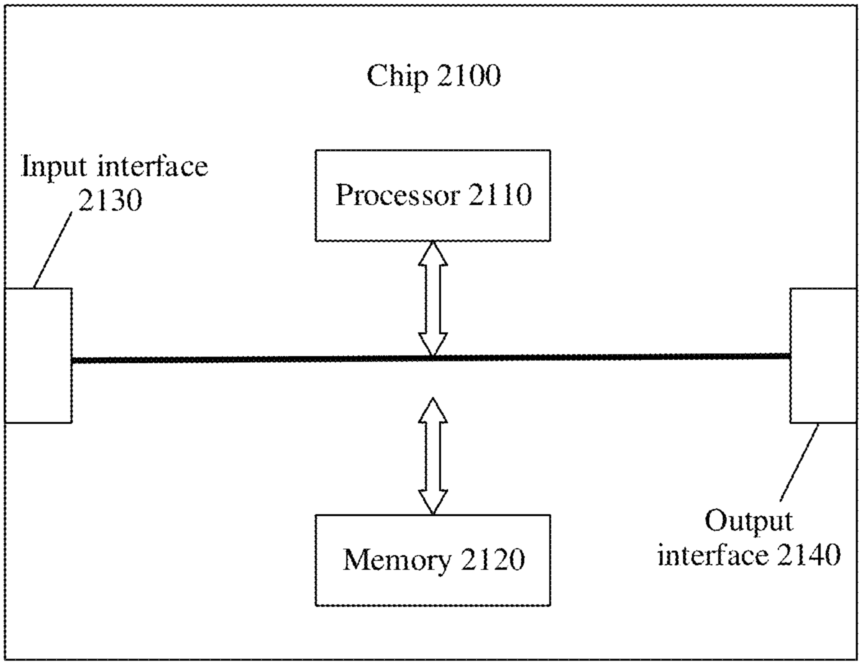
FIG. 21 is a schematic structural diagram of a chip 2100 according to some embodiments of the present disclosure.

FIG. 21 is a schematic structural diagram of a chip 2100 according to some embodiments of the present disclosure. The chip 2100 includes a processor 2110. The processor 2110 is capable of calling and running a computer program from a memory to implement the method in the embodiment of the present disclosure.

In some embodiments, as shown in FIG. 21, the chip 2100 may further include a memory 2120. The processor 2110 is capable of calling and running a computer program from the memory 2120 to perform the methods in the embodiments of the present disclosure.

The memory 2120 may be a separate device independent of the processor 2110 or integrated in the processor 2110.

In some embodiments, the chip 2100 may further include an input interface 2130. The processor 2110 may control the input interface 2130 to communicate with other devices or chips, and specifically, may acquire information or data sent by other devices or chips.

In some embodiments, the chip 2100 may further include an output interface 2140. The processor 2110 may control the output interface 2140 to communicate with other devices or chips, and specifically, may output information or data to other devices or chips.

In some embodiments, the chip is applicable to the terminal device in the embodiments of the present disclosure, the chip is capable of performing the corresponding flows of the terminal device in each method according to the embodiments of the present disclosure, which are not repeated herein for brevity.

In some embodiments, the chip is applicable to the network device in the embodiments of the present disclosure, and the chip is capable of performing the corresponding flows of the network device in each method according to the embodiments of the present disclosure, which are not repeated herein for brevity.

It should be understood that the chip mentioned in the embodiments of the present disclosure may also be referred to as a system on a chip, a system chip, a chip system, a system-on-chip chip, or the like.

The processor mentioned above may be a general processor, a digital signal processor (DSP), a field programmable gate array (FPGA), an application specific integrated circuit (ASIC) or other programmable logic devices, transistor logic devices, discrete hardware components, etc. The general processor mentioned above may be a microprocessor, or any conventional processor, or the like.

The memory mentioned above may be a volatile memory or a nonvolatile memory, or may include both volatile and nonvolatile memories. The nonvolatile memory may be a read-only memory (ROM), a programmable ROM (PROM), an erasable PROM (EPROM), an electrically EPROM (EEPROM), or a flash memory. The volatile memory may be a random access memory (RAM).

It should be understood that the memories are illustrative but not restrictive. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM) and so on. That is, the memory in the embodiments of the present disclosure is intended to include, but not limited to, these and any other suitable types of memories.

The above embodiments may be fully or partially implemented by software, hardware, firmware or any combination thereof. When implemented by software, the above embodiments may be fully or partially implemented in the form of a computer program product. The computer program product includes one or more computer instructions. When the computer program instructions are loaded and executed by a computer, the flows or functions according to the embodiments of the present disclosure are fully or partially generated. The computer may be a general-purpose computer, a special-purpose computer, a computer network, or other programmable apparatuses. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (such as a coaxial cable, an optical fiber, a digital subscriber line, DSL), or wireless (such as infrared, radio, or microwave) fashion. The computer-readable storage medium may be any available medium accessible by a computer or a data storage device integrated with one or more available mediums, such as a server or a data center. The available medium may be a magnetic medium (for example, a floppy disk, a hard disk, a magnetic tape), an optical medium (for example, a digital video disc, DVD), or a semiconductor medium (for example, a solid state disk, SSD) and the like.

It should be understood that in various embodiments of the present disclosure, the serial number of each above process does not mean the order of execution, and the order of execution of each process should be determined according to its function and inherent logic, and should not constitute any limitation on the implementation process of the embodiment of the present disclosure.

Those skilled in the art may clearly understand that for the convenience and conciseness of description, the specific operating processes of the systems, apparatuses and units described above may refer to the corresponding processes in the aforementioned method embodiments, and will not be repeated here.

Described above are exemplary embodiments of the present disclosure, but the protection scope of the present disclosure is not limited to these exemplary embodiments. Various variations or substitutions readily conceivable by those skilled in the art within the technical scope disclosed in the present disclosure should fall within the protection scope of the present disclosure. Therefore, the protection scope of the present disclosure should be subjected to the appended claims.

What is claimed is:

1. A method for controlling quality of service (QoS), applicable to a terminal device, the method comprising:

receiving service data flow information and corresponding radio resource information from a base station, wherein the service data flow information comprises a service data flow identifier;

determining a service data flow to which data belongs;

determining a radio resource corresponding to the service data flow according to service data flow information and corresponding radio resource information; and sending the data over the radio resource;

the method further comprising:

receiving a service data flow template and a corresponding service data flow identifier from a second network device;

wherein determining the service data flow to which the data belongs comprises:

determining a service data flow identifier corresponding to the service data flow template matched with the data.

2. The method according to claim 1, wherein the service data flow template comprises at least one data packet filter.

3. The method according to claim 1, wherein the radio resource information comprises a radio bearer identifier.

4. The method according to claim 1, wherein receiving, by the terminal device, the service data flow information and the corresponding radio resource information from the base station comprises:

receiving, by the terminal device, a set of service data flow identifiers and corresponding radio resource information from the base station.

5. The method according to claim 4, wherein the set of service data flow identifiers is expressed by at least one of:

at least two service data flow identifiers; or a value range of the service data flow identifiers.

6. A terminal device, comprising: a processor, a memory configured to store a computer program, and a transceiver, wherein the processor is configured to call and run the computer program stored in the memory to perform:

receiving service data flow information and corresponding radio resource information from a base station, wherein the service data flow information comprises a service data flow identifier;

determining a service data flow to which data belongs; and determining a radio resource corresponding to the service data flow according to service data flow information and corresponding radio resource information;

wherein the processor is configured to control the transceiver to perform:

sending the data over the radio resource;

wherein the processor is configured to control the transceiver to further perform:

receiving a service data flow template and a corresponding service data flow identifier from a second network device;

wherein the processor is configured to call and run the computer program stored in the memory to further perform:

determining the service data flow identifier corresponding to the service data flow template matched with the data.

7. The terminal device according to claim 6, wherein the service data flow template comprises at least one data packet filter.

8. The terminal device according to claim 6, wherein the radio resource information comprises a radio bearer identifier.

9. The terminal device according to claim 6, wherein the processor is configured to call and run the computer program stored in the memory to further perform:

receiving a set of service data flow identifiers and the corresponding radio resource information from the base station.

10. The terminal device according to claim 9, wherein the set of service data flow identifiers is expressed by at least one of:

at least two service data flow identifiers; or a value range of the service data flow identifiers.

11. A network device, comprising: a processor, a memory configured to store a computer program, and a transceiver, wherein control the transceiver to perform:

receiving service data flow information and a corresponding QoS parameter;

wherein the processor is configured to call and run the computer program stored in the memory to perform:

allocating, according to the QoS parameter, a radio resource to a service data flow corresponding to the service data flow information, and determining the service data flow information and corresponding radio resource information;

sending the service data flow information and the corresponding radio resource information, wherein the service data flow information comprises a service data flow identifier;

wherein the service data flow identifier is configured to determine a service data flow identifier corresponding to a service data flow template matched with data.

12. The network device according to claim 11, wherein the processor is configured to control the transceiver to perform:

receiving the service data flow information and the corresponding QoS parameter from a second network device.

13. The network device according to claim 11, wherein the network device comprises a base station.

14. The network device according to claim 11, wherein the processor is configured to control the transceiver to further perform:

receiving a set of service data flow identifiers and the corresponding QoS parameter.

15. The network device according to claim 14, wherein the set of service data flow identifiers is expressed by at least one of:

at least two service data flow identifiers; or a value range of the service data flow identifiers.

16. The network device according to claim 11, wherein the processor is configured to control the transceiver to further perform:

sending a set of service data flow identifiers and the corresponding radio resource information.

* * * * *